United States Patent
Ichinose et al.

(10) Patent No.: US 6,834,502 B2
(45) Date of Patent: Dec. 28, 2004

(54) COMBUSTION TURBINE POWER GENERATION SYSTEM AND METHOD OF CONTROLLING THE SAME

(75) Inventors: Masaya Ichinose, Hitachiota (JP); Motoo Futami, Hitachiota (JP); Hiroshi Arita, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/437,913

(22) Filed: May 15, 2003

(65) Prior Publication Data

US 2004/0003595 A1 Jan. 8, 2004

Related U.S. Application Data

(63) Continuation of application No. 10/246,470, filed on Sep. 19, 2002, now Pat. No. 6,684,639.

(30) Foreign Application Priority Data

Jul. 8, 2002 (JP) ........................................ 2002-198833

(51) Int. Cl.[7] .............................................. F01K 13/02
(52) U.S. Cl. ........................................... 60/660; 60/645
(58) Field of Search ...................... 60/645, 660; 290/2, 290/12

(56) References Cited

U.S. PATENT DOCUMENTS 3,658,153 A * 4/1972 Berman ........................ 184/6.3
5,252,860 A * 10/1993 McCarty et al. ............ 290/40 R
5,550,410 A * 8/1996 Titus ............................ 290/52
6,269,625 B1 * 8/2001 Dibble et al. .................. 60/777
6,285,089 B1 * 9/2001 Nelson .......................... 290/52

FOREIGN PATENT DOCUMENTS

JP          9-289776          11/1997

* cited by examiner

*Primary Examiner*—Hoang Nguyen
(74) *Attorney, Agent, or Firm*—Antonelli, Terry, Stout & Kraus, LLP (57) ABSTRACT

A combustion turbine power generating system and method in which the system includes a permanent magnet type AC power generator, a combustion turbine that drives the AC power generator, a first converter enabling conversion between AC current and DC current and having an AC side connected to the AC power generator, a second converter enabling conversion between AC current and DC current and having a DC side connected to a DC output side of the first converter, a capacitor connected between the first and second converters, a generator-speed control unit that controls the first converter and a DC voltage control unit that controls a DC-side voltage of the second converter. The generator-speed control unit controls the first converter on the basis of a number of revolution command value.

6 Claims, 5 Drawing Sheets

COMBUSTION TURBINE POWER GENERATION SYSTEM AND METHOD OF CONTROLLING THE SAME

CROSS REFERENCE TO RELATED APPLICATION

This is a continuation of U.S. application Ser. No. 10/246,470, filed Sep. 19, 2002, now U.S. Pat. No. 6,684,639, the subject matter of which is incorporated by reference herein.

BACKGROUND OF THE INVENTION

1. Filed of the Invention

The present invention relates to a combustion turbine power generating system that can realize high efficient and high reliable operation and method of controlling the same.

2. Description of Related Art

As disclosed in JP-A-09-289776, in a case of a conventional combustion turbine power generating system, a command value for number of revolutions is calculated from a load power to be outputted and the command value for the number of revolutions is inputted to a turbine controller to control the number of revolutions for a combustion turbine, thereby controlling the number of revolutions for a power generator.

In the above technique, the command value for the number of revolutions is calculated from the output power of the turbine on the basis of the knowledge that the output power of the turbine is proportional to its number of revolutions.

The turbine controller adjusts a quantity of fuel to be fed on the basis of the command value for the number of revolutions calculated as above and controls the number of revolutions. However, since the efficiency of turbine is influenced by a temperature of suction air or the like, the turbine cannot be always operated at the number of revolutions that the highest efficiency and a low Nox (nitrogen oxide) are attained for a certain fuel quantity. Accordingly, it is difficult that the efficiency of the turbine is always kept to be high.

SUMMARY OF THE INVENTION

It is an object of the present invention to make power generation at high efficient state of turbine by controlling the number of revolutions of a power generator.

According to an aspect of the present invention, in a combustion turbine power generating system for supplying an output of turbine to an electric power system through a power generator and a power converter capable of converting the power between AC current and DC current, the speed of power generator is always controlled by means of the power converter connected to the power generator.

Further, an optimum speed command is produced from state quantity of the turbine and the speed of power generator is controlled on the basis of the optimum speed command by means of the power converter connected to the power generator.

Moreover, when a fuel quantity is varied by adjustment of fuel or the like and a current of the power generator is greater than a predetermined value, the speed of power generator is increased temporarily.

Other objects, features and advantages of the invention will become apparent from the following description of the embodiments of the invention taken in conjunction with the accompanying drawings.

DETAILED DESCRIPTION OF THE EMBODIMENTS

Figure 1:
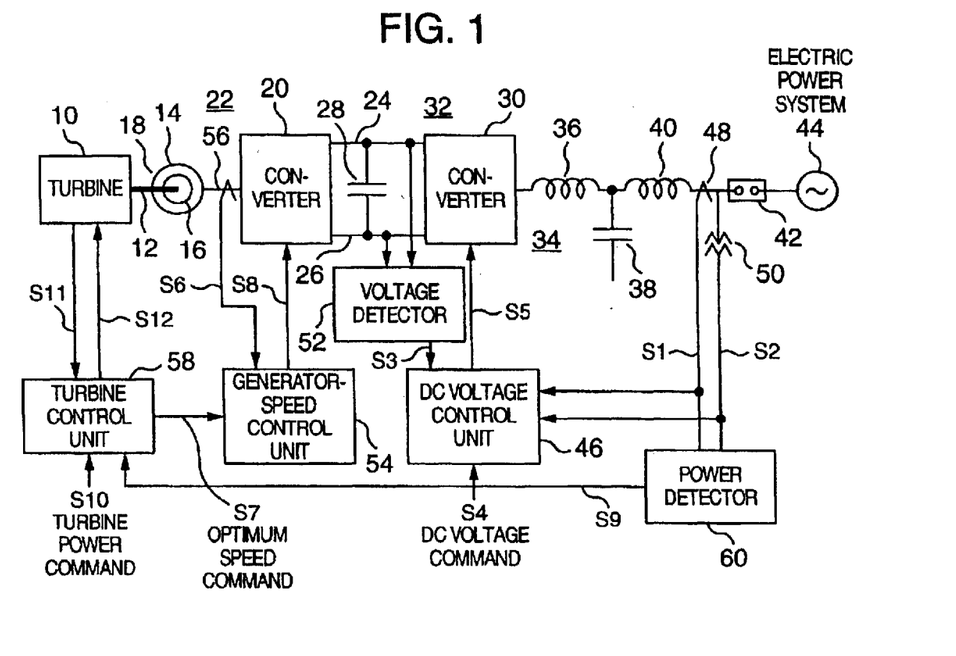
FIG. 1 is a block diagram schematically illustrating the whole of a main circuit and a control system of a combustion turbine power conversion system according to an embodiment of the present invention.

An embodiment of a combustion turbine power generating system to which the present invention is applied is now described with reference to the accompanying drawings. FIG. 1 is a block diagram schematically illustrating the combustion turbine power generating system.

Referring to FIG. 1, a rotation axis 12 of a turbine 10 is connected to a shaft that supports a rotor 16 of a permanent-magnet generator 14. The side of a stator 18 of the permanent-magnet generator 14 is connected to an AC side 22 of a converter 20. The permanent-magnet generator 14 supplies an output power itself to the converter 20 in power generating operation and receives electric power from the converter 20 in motor operation.

DC terminals 24 and 26 of the converter 20 are connected to a DC side 32 of a converter 30 through a capacitor 28. An AC output side 34 of the converter 30 is connected to a reactor 36 constituting an AC filter for eliminating harmonics. The converters 20 and 30 are constituted by well-known semiconductor switching elements and make conversion between AC current and DC current by turning a gate pulse on and off.

In this embodiment, in power generating operation, the converter 20 converts AC output power of the AC power generator 14 into DC power and the converter 30 converts DC output power from the converter 20 into AC power.

Further, the converter 30 converts AC power from an electric power system 44 into DC power and supplies the DC power to the converter 20. In motor operation, conversely, the converter 30 receives the AC power from the electric power system 44 and converts the AC power into DC power to supply the DC power to the converter 20. The converter 20 converts the DC power into AC power and operates the AC power generator as an electric motor.

The reactor 36 is connected to a capacitor 38 and a reactor 40 constituting an AC filter. The two series-connected reactors 36 and 40 and the capacitor 38 connected to the junction thereof constitute a T-type AC filter. The reactor 40 is connected through a circuit breaker 42 to the electric power system 44.

A DC voltage control unit 46 for the converter 30 is supplied with detection values S1 and S2, a voltage detection value S3 and a DC voltage command value S4 to supply a gate signal S5 to the converter 30.

The detection values S1, S2 and the voltage detection value S3 are produced from a current detector 48 that detects a current flowing through the reactor 40, a voltage detector 50 disposed on the side of the electric power system 44 of the reactor 40, and a voltage detector 52 for the capacitor 28 disposed on the DC side of the converter 30, respectively.

Further, a generator-speed control unit 54 connected to the converter 20 is supplied with a detection value S6 and an optimum speed command value S7 and supplies a gate signal S8 to the converter 20. The detection value S6 and the optimum speed command value S7 are produced from a current detector 56 for detecting a current produced by the permanent-magnet generator 14 and a turbine control unit 58, respectively.

The turbine control unit 58 is supplied with a power detection value S9, a power command S10 and state quantity S11 such as temperature and pressure from the turbine 10 and supplies a fuel adjustment command S12 to the turbine 10.

A power detector 60 detects electric power from AC current S1 and AC voltage S2 and produces the power detection value S9. Further, the turbine control unit 58 supplies the optimum speed command value S7 to the generator-speed control unit 54 connected to the power converter 20.

Figure 2:
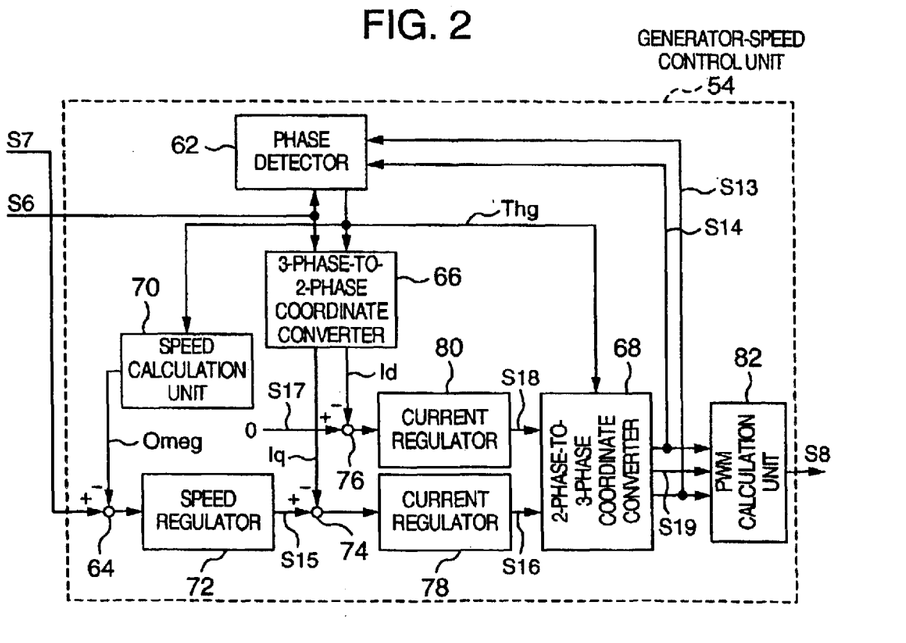
FIG. 2 is a block diagram schematically illustrating a generator-speed control unit according to an embodiment of the present invention in detail.

FIG. 2 is a block diagram schematically illustrating the generator-speed control unit 54 connected to the converter 20 in detail. Referring to FIG. 2, the generator-speed control unit 54 is supplied with the optimum speed command value S7 and the generator current detection value S6. The optimum speed command value S7 is supplied to a subtracter 64.

A phase detector 62 is supplied with output voltage command values S13 and S14 of a 2-phase/3-phase coordinate converter 68 and the generator-current detection value S6 to calculate a phase signal Thg of an induced voltage from the power generator 14 by means of a sensor-less phase detection system. The phase signal is supplied to a 3-phase-to-2-phase coordinate converter 66, the 2-phase-to-3-phase coordinate converter 68 and a speed calculation unit 70.

The speed calculation unit 70 calculates a speed Omeg from the phase signal Thg of the induced voltage in accordance with the expression (1):

$$\text{Omeg} = \Delta\theta/\Delta t \tag{1}$$

$\Delta\theta$: increment of the phase signal Thg
$\Delta t$: variation of time

The subtracter 64 calculates a deviation between the optimum speed command value S7 and the calculated speed value Omeg to supply the deviation to a speed regulator 72. The speed regulator 72 can be constituted by, for example, a proportional integral controller. The speed regulator 72 regulates a q-axis current command value (torque current command value) S15 so that the speed deviation is reduced to zero and supplies the command value to a subtracter 74.

The 3-phase-to-2-phase coordinate converter 66 calculates a d-axis current (excitation current component) Id and a q-axis current (torque current component) Iq from the inputted generator-current detection value S6 and the phase signal Thg of the induced voltage in accordance with the expression (2). The d-axis current detection value Id is supplied to a subtracter 76 and the q-axis current detection value Iq is supplied to the subtracter 74.

$$\begin{pmatrix} Id \\ Iq \end{pmatrix} = \begin{pmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{pmatrix} \begin{pmatrix} \cos(Thg) & \sin(Thg) \\ \sin(Thg) & -\cos(Thg) \end{pmatrix} \tag{2}$$

The subtracter 74 calculates a deviation between the q-axis current command value S15 and the q-axis current detection value Iq and supplies it to a current regulator 78. The current regulator 78 regulates a q-axis voltage command value S16 so that the deviation between the command value S15 and the detection value Iq is reduced to zero and supplies the regulated value to the 2-phase-to-3-phase coordinate converter 68.

Further, the subtracter 76 calculates a deviation between a d-axis current command value S17 and the d-axis current detection value Id to thereby supply the deviation to a current regulator 80. The current regulator 80 regulates a d-axis voltage command value S18 which is an output thereof so that a deviation between the command value S17 and the detection value Id is reduced to zero, and supplies the regulated value to the 2-phase-to-3-phase coordinate converter 68. The current regulators 78 and 80 can be constituted by, for example, a proportional integration controller.

The 2-phase-to-3-phase coordinate converter 68 is supplied with the phase signal Thg, the d-axis voltage command value S18 and the q-axis voltage command value S16 to be thereby calculated voltage command values S13, S14 and S19 produced by the 2-phase-to-3-phase coordinate converter 68 in accordance with the expressions (3) and (4) to be supplied to a PWM calculation unit (pulse-width-modulation calculation unit) 82.

$$\begin{pmatrix} Vagr \\ Vbgr \end{pmatrix} = \begin{pmatrix} \cos(Thg) & \sin(Thg) \\ \sin(Thg) & -\cos(Thg) \end{pmatrix} \begin{pmatrix} Vdgr \\ Vqgr \end{pmatrix}$$

$$\begin{pmatrix} Vugr \\ Vvgr \\ Vwgr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Vagr \\ Vbgr \end{pmatrix}$$

The PWM calculation unit 82 calculates a gate signal S8 on the basis of the inputted voltage commands S13, S14 and S19. The signal S8 is supplied to the converter 20 constituted by the pulse-width-modulation system to turn on and off semiconductor elements thereof.

An example of operation of FIG. 2 is now described. In the generator-speed control unit 54 of FIG. 2, it is defined that a torque current in motor operation of the generator 14 is positive and a torque current in power generating operation is negative.

When the optimum speed command value S7 of the turbine control unit 58 is now increased, the input of the speed regulator 72 is increased. Accordingly, the output (a torque current command value S15) of the speed regulator 72 is increased in the positive direction.

Since the torque current in power generating operation is defined to be negative, the fact that the torque current command value S15 is increased in the positive direction means that the torque current is reduced. When the torque current command value S15 is increased in the positive direction, the input of the current regulator 78 is increased.

In order to reduce the torque current, the current regulator 78 changes the q-axis voltage command value S16 to delay the phase of the voltage produced by the converter 20. Consequently, the phase difference between the voltage and the induced voltage of the generator 14 is made small and the torque current is reduced.

The reduction of the torque current corresponds to reduction of electric energy taken out from the generator 14. The generator 14 increases rotational energy by the reduction of the taken-out energy, so that the rotational speed thereof is increased.

This can be explained from the equation of motion of the generator given by the expression (5). In the expression (5), when energy of the generator 14 received from the turbine 10 is T and energy taken out by the converter 20 from the generator 14 is Ti, T>Ti represents acceleration, T=Ti fixed speed and T<Ti deceleration.

$$T-Ti=j \cdot d\omega/dt \tag{5}$$

Conversely, when the speed command value S7 is reduced in power generating operation, the positive-direction input of the speed regulator 72 is reduced. Accordingly, the output (torque current command value S15) of the speed regulator 72 is increased in the negative direction.

Since the torque current in power generating operation is defined to be negative, change of the torque current command value S15 in the negative direction means that the torque current is increased. In order to increase the torque current, the current regulator 78 reduces the q-axis voltage command value S16 and advances the phase of the voltage produced by the converter 20. Thus, a phase difference between the voltage and the induced voltage of the generator 1 is increased.

The increase of the torque current corresponds to increase of electric energy taken out from the generator 14. The generator 14 reduces the rotational energy by the increase of the taken-out energy, so that the rotational speed thereof is reduced.

In this case, the relation of the energy T inputted to the generator 14 from the turbine 10 and the energy Ti taken out from the generator 14 by the converter 20 is T<Ti, so that the generator is decelerated.

Figure 3:
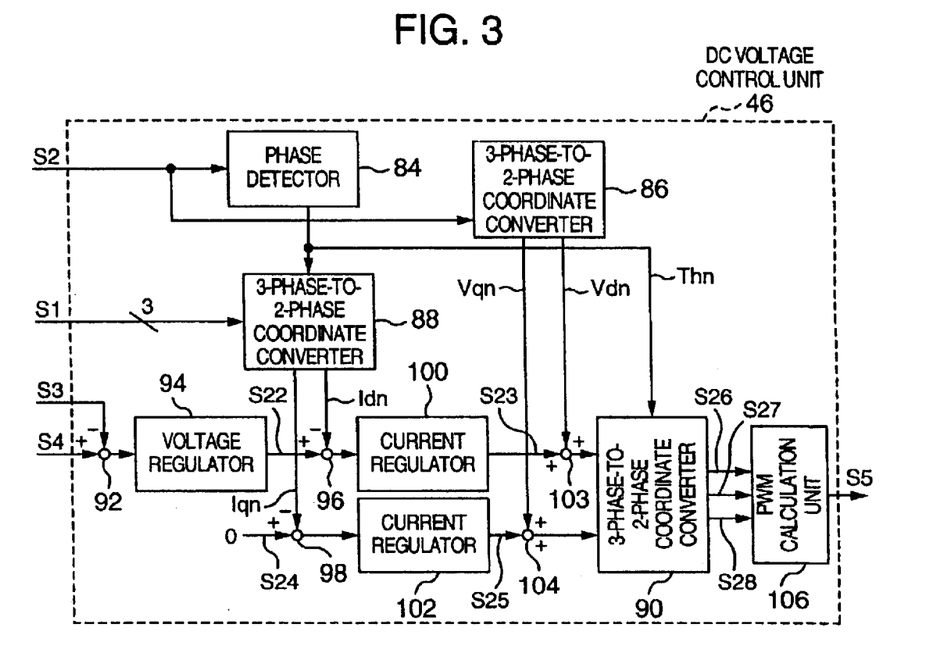
FIG. 3 is a block diagram schematically illustrating a DC voltage control unit according to an embodiment of the present invention in detail.

FIG. 3 is a block diagram schematically illustrating the DC voltage control unit 46 for the converter 30 in detail. In FIG. 3, the DC voltage control unit 46 is supplied with the current detection value S1, the voltage detection value S2, the DC voltage detection value S3 and the DC voltage command value S4.

The AC voltage detection value S2 is supplied to a phase detector 84 and a 3-phase-to-2-phase coordinate converter 86. The phase detector 84 calculates a phase signal Thn following the voltage of the electric power system 44 by means of the phase-locked loop (PLL) system, for example, and supplies the phase signal Thn to 3-phase-to-2-phase coordinate converters 88 and 86 and a 2-phase-to-3-phase coordinate converter 90.

The DC voltage command value S4 and the DC voltage detection value S3 are inputted to a subtracter 92, which supplies a deviation between the DC voltage command value S4 and the DC voltage detection value S3 to a voltage regulator 94.

The voltage regulator 94 can be constituted by, for example, a proportional integration controller. The DC voltage regulator 94 regulates a d-axis current command value (effective current command value) S22 produced therefrom so that the inputted deviation is reduced to zero and supplies the command value to a subtracter 96.

The 3-phase-to-2-phase coordinate converter 88 calculates a d-axis current detection value Idn (effective current) and a q-axis current detection value Iqn (reactive current) from the inputted current S1 in accordance with the conversion equation given by the expression (2) and supplies the d-axis current detection value Idn and the q-axis current detection value Iqn to the subtracter 96 and a subtracter 98, respectively.

The subtracter 96 calculates a deviation between the d-axis current command value S22 and the d-axis current detection value Idn and supplies the deviation to a current regulator 100. The current regulator 100 regulates a d-axis voltage command value S23 so that the deviation between the command value S22 and the detection value Idn is reduced to zero and supplies the command value to an adder 103.

Similarly, the subtracter 98 calculates a deviation between a q-axis current command value S24 and the q-axis current detection value Iqn and supplies the deviation to a current regulator 102. The current regulator 102 regulates a q-axis voltage command value S25 so that a deviation between the inputted command value and the detection value is reduced to zero and supplies the command value to an adder 104. The current regulators 100 and 102 can be constituted by, for example, a proportional integration controller.

The 3-phase-to-2-phase coordinate converter 86 calculates a d-axis voltage detection value (phase component coincident with system voltage 44) and-a q-axis voltage detection value (component orthogonal to the d-axis voltage detection value) Vqn from the inputted voltage S2 in accordance with the conversion equation given by the equation (2) and supplies the values Vdn and Vqn to the adders 103 and 104, respectively.

The adder 103 adds the d-axis voltage command value S23 and the d-axis voltage detection value Vdn and supplies its sum to the 2-phase-to-3-phase coordinate converter 90. Similarly, the adder 104 adds the q-axis voltage command value S25 and the q-axis voltage detection value Vqn and supplies its sum to the 2-phase-to-3-phase coordinate converter 90.

The 2-phase-to-3-phase coordinate converter 90 is supplied with the phase signal Thn and the results of the adders 104 and 103 and calculates voltage command values S26, S27 and S28 produced therefrom in accordance with the conversion expressions (3) and (4) to supplies them to the PWM calculation unit 106.

The PWM calculation unit 106 calculates the gate signal S5 from the inputted voltage commands S26, S27 and S28. In order to control to turn on and off the semiconductor elements of the converter 30 constituted by the pulse width modulation system, the gate signal S5 is supplied to the converter 30.

Figure 4:
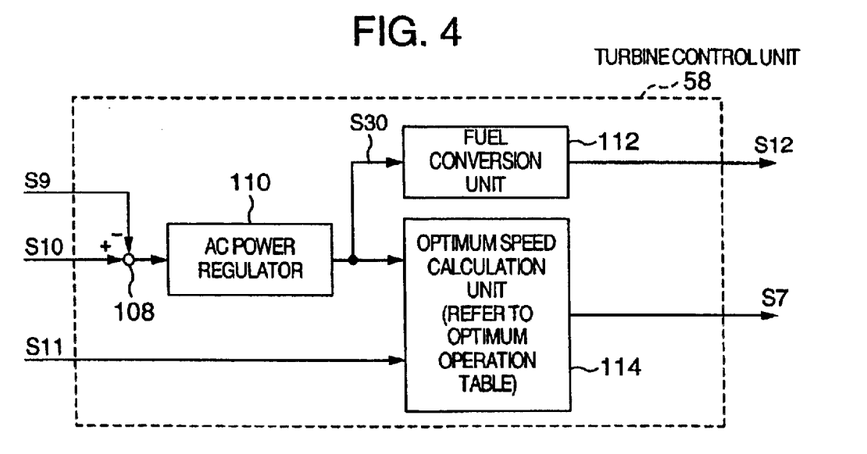
FIG. 4 is a block diagram schematically illustrating a turbine control unit according to an embodiment of the present invention in detail.

FIG. 4 is a block diagram schematically illustrating the turbine control unit 58 in detail. In FIG. 4, the turbine control unit 58 is supplied to the power command value S10, the power detection value S9 and the state quantity S11.

A subtracter 108 calculates a deviation between the power command value S10 and the power detection value S9 and supplies the deviation to an AC power regulator 110. The AC power regulator 110 can be constituted by, for example, a proportional integration controller. The AC power regulator 110 produces a power command value S30 which is the power command value S10 corrected so that the deviation between the command value and the detection value is reduced to zero.

The corrected power command value S30 is supplied to a fuel conversion unit 112. The fuel conversion unit 112 calculates the fuel adjustment command value S12 from the power and outputs the command value.

Further, the corrected power command value 30 is also supplied to an optimum speed calculation unit 114. The optimum speed calculation unit 114 is supplied with the corrected power command value S30 and the state quantity S11 and refers to optimum operation conditions in previously set states to produce the optimum speed command value S7 for satisfactory turbine efficiency.

Figure 5:
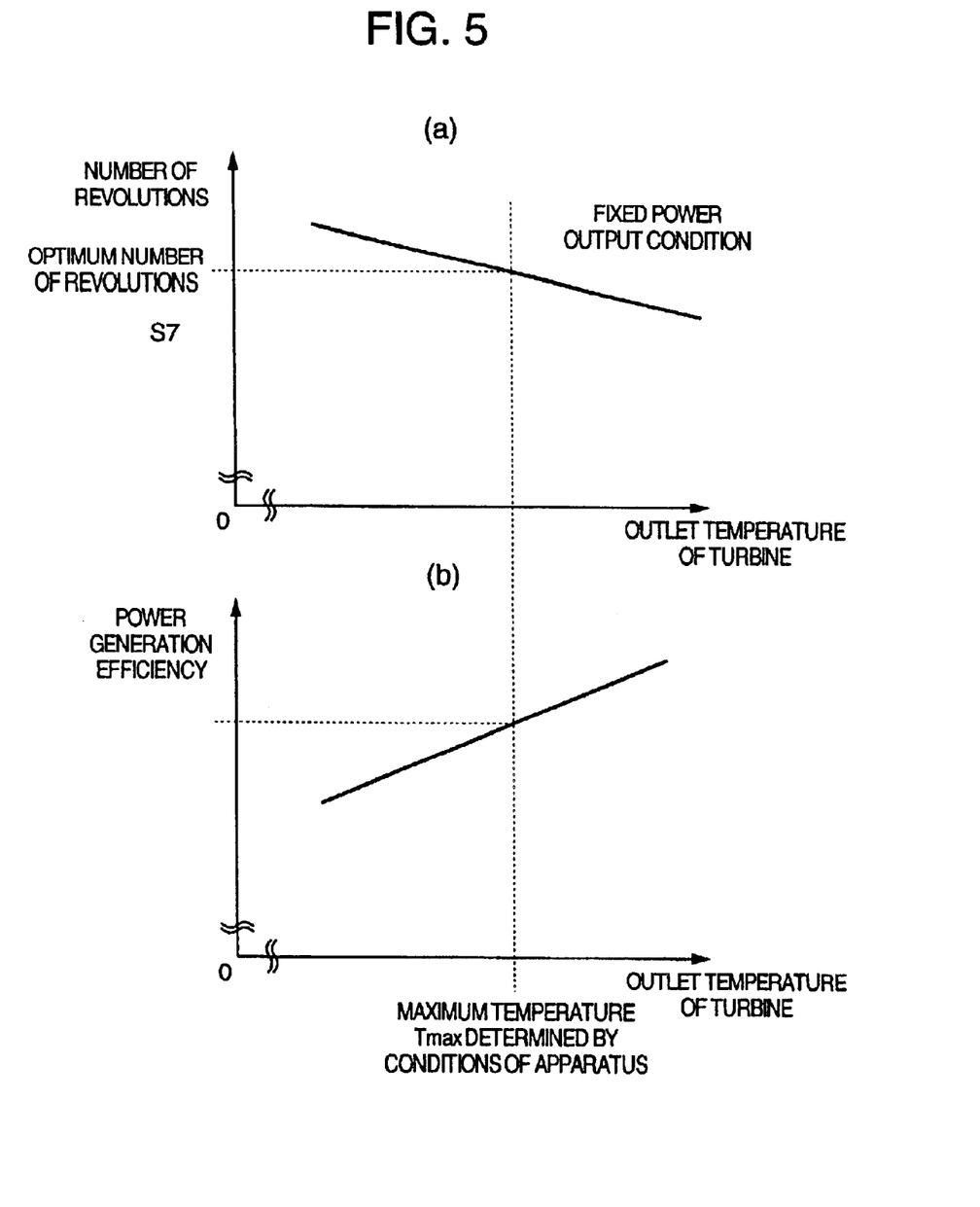
FIG. 5 is a diagram explaining an optimum speed calculation unit of a turbine control unit according to a second embodiment of the present invention.

Referring now to FIG. 5, operation of the optimum speed calculation unit 114 is described. The graph shown in (a) of FIG. 5 shows a relation of the number of revolutions of the generator 14 and a temperature at an outlet of the turbine 10. Further, the graph shown in (b) of FIG. 5 shows a relation of the power generation efficiency and the temperature at the outlet of the turbine 10.

When the temperature at the outlet of the turbine, for example, is used as the state quantity S11 of the turbine 10, the optimum speed command S7 is decided from the optimum number of revolutions (shown in the graph of (a) in FIG. 5) for operation at the highest power generation efficiency.

When the optimum number of revolutions is tabulated for each output power, for example, which is a certain power output condition from the graphs shown in FIG. 5, the optimum speed calculation unit 114 can always produce the optimum speed command value S7.

Further, in addition to the tabulation, the optimum speed command value S7 can be obtained even by reducing the speed when the outlet temperature of the turbine is low and by increasing the speed when the outlet temperature of the turbine is high so that the temperature of the turbine is equal to the permissible maximum temperature Tmax.

In the above description, the outlet temperature of the turbine is used, while even the state quantity corresponding to the outlet temperature of the turbine is used to attain the same function. Further, the efficiency of the general combustion turbine as described above is varied depending on the number of revolutions and even the combustion turbine utilizing high-humidity air can attain the same effects.

According to the embodiment, since the speed of the generator can be always controlled by the converter 20 connected to the generator 14 even in power generating operation, its control is simplified as compared with the case where control is once stopped and rectification by diodes is made.

Further, the optimum speed command S7 is prepared from the state quantity S11 of the turbine 10 and the speed of the generator is controlled by the converter 20 connected to the generator 14 on the basis of the optimum speed command S7, so that the generator 14 can be operated at the speed of the satisfactory turbine efficiency.

In the embodiment, sensor-less control is used for control of the converter of the generator 14, while even in the case where a position detector connected to the rotation axis 12 of the generator 14 is used to detect a phase, the same effects can be attained.

Another embodiment of the present invention is now described. Like constituent elements are designated by like reference numerals throughout the drawings and detailed description thereof is omitted.

[Embodiment 2]

Figure 6:
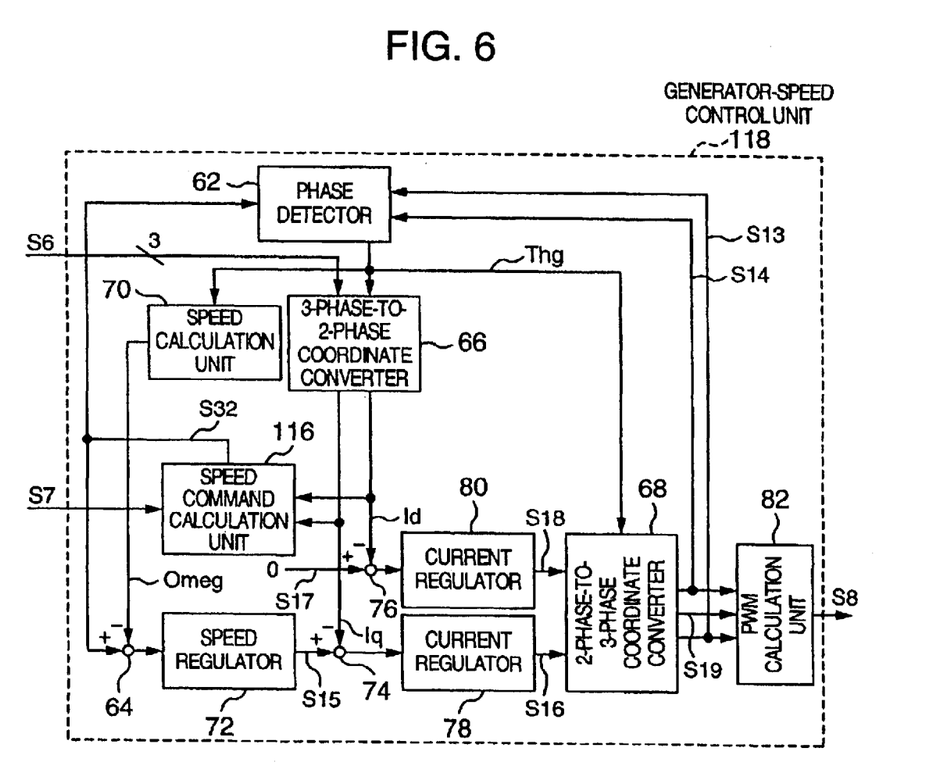
FIG. 6 is a block diagram schematically illustrating a generator-speed control unit according to a second embodiment of the present invention in detail.
Figure 7:
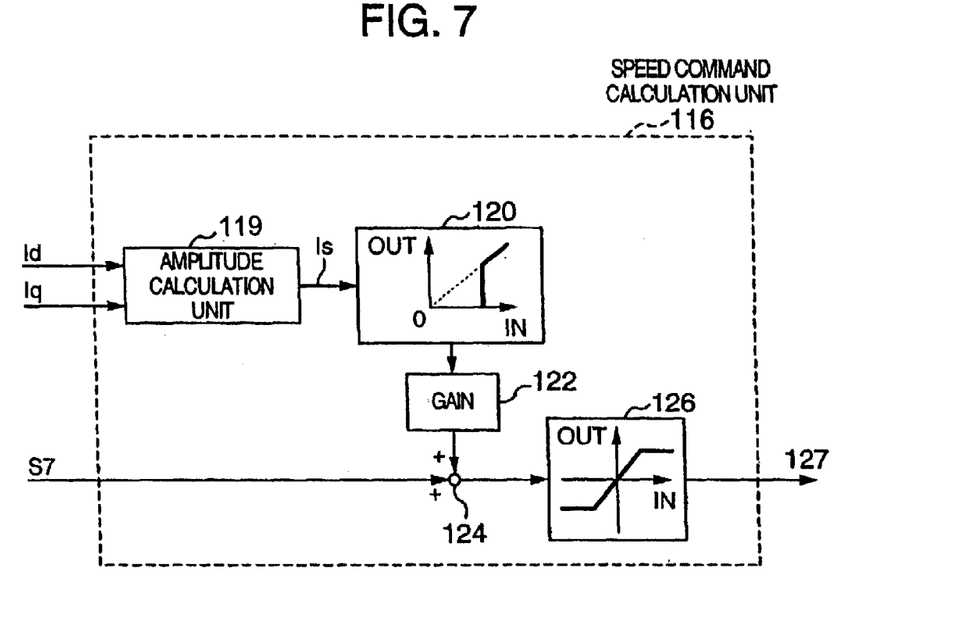
FIG. 7 is a block diagram schematically illustrating a speed command calculation unit according to a second embodiment of the present invention in detail.
Figure 8:
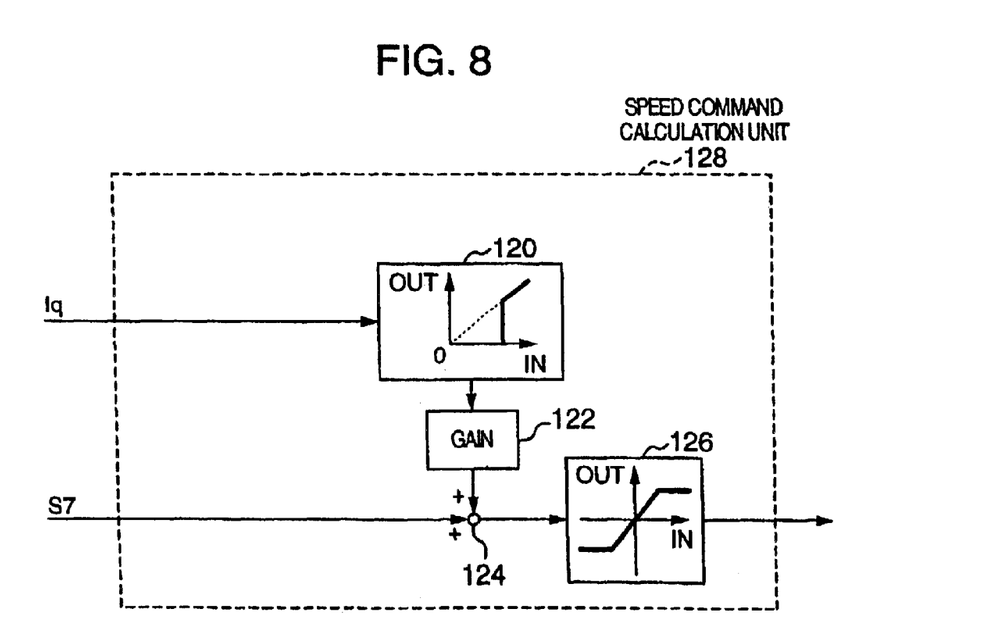
FIG. 8 is a block diagram schematically illustrating another speed command calculation unit according to a second embodiment of the present invention in detail.

FIGS. 6 to 8 schematically illustrate another embodiment for realizing a combustion turbine power converting apparatus and a control method of the present invention. The generator-speed control unit 118 of FIG. 6 is different in partial configuration from the generator-speed control unit 54 of the embodiment 1.

The optimum speed command value S7 inputted from the turbine control unit 58 is supplied to a speed command calculation unit 116 and an output of the speed command calculation unit 116 is used as the speed command value. The generator-speed control unit 54 of FIG. 1 can be replaced by the generator-speed control unit 118. Other configuration shown in FIG. 6 is the same as FIG. 2 and accordingly detailed description thereof is omitted.

FIG. 7 is a block diagram schematically illustrating the speed command calculation unit 116 shown in FIG. 6. The speed command calculation unit 116 is supplied with the d-axis current detection value Id (exciting current component), the q-axis current detection value Iq (torque current component) and the optimum speed command value S7.

The d-axis current detection value Id and the q-axis current detection value Iq are inputted to an amplitude calculation unit 119, which calculates an amplitude Is of the current in accordance with the expression (6) and supplies it to a dead-band limiter 120.

$$Is = \sqrt{Id^2 + Iq^2} \qquad (6)$$

The dead-band limiter 120 outputs the input value Is when the input value Is exceeds a set value. The output value of the dead-band limiter 120 is supplied to a gain multiplier 122, which multiplies the output value by a predetermined gain and supplies its result to an adder 124.

The adder 124 is supplied with the multiplication result and the optimum speed command value S7 and supplies its addition result to a limiter 126 for preventing over-speed exceeding the command value. The limiter 126 produces a limit value when the input value exceeds the limit value and produces the input value when the input value is smaller than or equal to the limit value.

According to the embodiment, in addition to the advantages of the embodiment 1, the speed of the generator is temporarily increased to absorb or discharge energy produced by inertial energy upon transient variation that fuel is varied by adjustment of fuel fed to the turbine and the current of the converter 20 is larger than a predetermined value.

More particularly, since variation of mechanical input can be absorbed by mechanical energy of the rotating body to suppress electrical variation, there can be realized the reliable system that can prevent the over-current of the converter 20.

Further, in the embodiment, the system using the amplitude of the current has been described, while even a speed command calculation unit 128 using the q-axis current (torque current) detection value as shown in FIG. 8 can attain the same effects.

As described above, in the embodiment, since the speed is always controlled by the converter connected to the generator even in power generating operation, the control is simplified as compared with the case where control is once stopped and rectification by diodes is made.

Further, the optimum speed command is prepared from the state quantity of the turbine and the speed of the generator is controlled by the converter connected to the generator on the basis of the optimum speed command, so that the generator can be operated at speed of the satisfactory turbine efficiency.

Moreover, since the speed of the generator is increased temporarily to absorb or discharge energy produced by inertial energy upon transient variation that fuel is varied by adjustment of fuel and the current of the converter is larger than a predetermined value, there can be realized the reliable system that can prevent the over-current of the converter.

When the current of the converter is increased, the speed is controlled to be increased temporarily and accordingly there can be realized the reliable system that can prevent the over-current of the converter.

According to the present invention, since the speed is always controlled by the converter connected to the generator even in power generating operation, the control is simplified as compared with the case where control is once stopped and rectification by diodes is made.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A combustion turbine power generating system comprising:
    a permanent-magnet type AC power generator;
    a combustion turbine that drives said permanent-magnet type AC power generator;
    a first converter that enables conversion between AC current and DC current and having an AC side connected to a stator of said permanent-magnet type AC power generator;
    a second converter that enables conversion between AC current and DC current and having a DC side connected to a DC output side of said first converter;
    a capacitor connected between said first and second converters;
    a circuit breaker connected between an AC side of said second converter and an electric power system;
    generator-speed control means that controls said first converter;
    a position detector connected to a rotation axis of said permanent-magnet type AC power generator; and
    DC voltage control means that controls a DC-side voltage of said second converter;
    wherein said generator-speed control means controls said first converter on the basis of a number of revolution command value, a detected value of an output signal from said position detector and an output voltage command value of said first converter, so that a number of revolutions of said permanent-magnet type AC power generator is controlled.

2. A combustion turbine power generating system according to claim 1, wherein said generator-speed control means includes means that detects an output current of said permanent-magnet type AC power generator, and when a detected current value of said permanent-magnet type AC power generator exceeds a predetermined value, said optimum number of revolution command value is modified to change the number of revolutions of said permanent-magnet type AC power generator.

3. A combustion turbine power generating system according to claim 1, wherein said generator-speed control means includes means that converts variation of mechanical energy produced by said combustion turbine into rotational energy of said permanent-magnet type AC power generator to thereby suppress electrical variation produced by said permanent-magnet type AC power generator.

4. A combustion turbine power generating system comprising:
    a permanent-magnet type AC power generator;
    a combustion turbine that drives said permanent-magnet type AC power generator;
    a first converter that enables conversion between AC current and DC current and having an AC side connected to a stator of said permanent-magnet type AC power generator;
    a second converter that enables conversion between AC current and DC current and having a DC side connected to a DC output side of said first converter;

a capacitor connected between said first and second converters;

a circuit breaker connected between an AC side of said second converter and an electric power system;

generator-speed control means that controls said first converter;

DC voltage control means that controls a DC-side voltage of said second converter; and combustion turbine control means that controls said combustion turbine;

a position detector connected to a rotation axis of said permanent-magnet type AC power generator;

wherein said combustion turbine control means obtains a state quantity of said combustion turbine and supplies an optimum number of revolution command value of said permanent-magnet type AC power generator obtained from said state quantity to said generator-speed control means; and wherein said generator-speed control means controls said first converter on the basis of said optimum number of revolution command value, a detected value of an output signal from said position detector and an output voltage command value of said first converter, so that a number of revolutions of said permanent-magnet type AC power generator is controlled.

5. A control method of a combustion turbine power generating system including a permanent-magnet type AC power generator, a combustion turbine that drives the permanent-magnet type AC power generator, a first converter that enables conversion between AC current and DC current and having an AC side connected to a stator of the permanent-magnet type AC power generator, a second converter that enables conversion between AC current and DC current and having a DC side connected to a DC side of the first converter, a capacitor connected between the first and second converters, a circuit breaker connected between an AC side of the second converter and an electric power system, generator-speed control means that controls the first converter, a position detector connected to a rotation axis of the permanent-magnet type AC power generator, DC voltage control means that controls a DC-side voltage of the second converter, and combustion turbine control means that controls said combustion turbine, comprising the steps of;

obtaining a state quantity of the combustion turbine by the combustion turbine control means and supplying an optimum number of a revolution command value of the permanent-magnet type AC power generator obtained from the state quantity to the generator-speed control means; and controlling by the generator-speed control means the first converter on the basis of the optimum number of the revolution command value, an output signal from the position detector and an output voltage command value of the first converter so as to control a number of revolutions of the permanent-magnet type AC power generator.

6. A control method according to claim 5, wherein the generator-speed control means changes the optimum number of the revolution command value so as to change the number of revolutions of the permanent-magnet type AC power generator when an output signal of the position detector exceeds a predetermined value.

* * * * *